United States Patent
Haunstein et al.

(10) Patent No.: US 7,336,856 B2
(45) Date of Patent: Feb. 26, 2008

(54) OPTIMUM DELAY LENGTH FOR A PMD COMPENSATOR

(75) Inventors: Herbert Haunstein, Dormitz (DE); Chongjin Xie, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 948 days.

(21) Appl. No.: 10/233,638

(22) Filed: Sep. 3, 2002

(65) Prior Publication Data
US 2004/0042701 A1    Mar. 4, 2004

(51) Int. Cl.
*G02B 6/00* (2006.01)
(52) U.S. Cl. .......................................... 385/11; 385/15
(58) Field of Classification Search ................ 385/11, 385/12, 14, 15, 24, 31; 359/237, 238, 239
See application file for complete search history.

(56) References Cited

U.S. PATENT DOCUMENTS

| | | | |
|---|---|---|---|
| 5,311,346 A * | 5/1994 | Haas et al. ................. | 398/146 |
| 5,613,027 A * | 3/1997 | Bhagavatula ................ | 385/123 |
| 6,266,457 B1 * | 7/2001 | Jacob ........................... | 385/11 |
| 6,385,356 B1 * | 5/2002 | Jopson et al. .................. | 385/11 |
| 6,417,948 B1 * | 7/2002 | Chowdhury et al. ........ | 398/158 |
| 6,522,818 B1 * | 2/2003 | Aso et al. .................... | 385/122 |
| 6,665,106 B2 * | 12/2003 | Noe ............................ | 359/254 |
| 2002/0176645 A1 * | 11/2002 | Wein et al. | |

FOREIGN PATENT DOCUMENTS

EP       0954126       * 3/1999

* cited by examiner

*Primary Examiner*—Daniel Stcyr

(57) ABSTRACT

A method for selecting an optimum delay length in a polarization mode dispersion (PMD) compensator configured with a constant-length delay line and deployed in an optical communication system. The optimum delay length depends on the data modulation format, bit rate, and/or signal bandwidth and is preferably selected such that outage probability in the communication system is at a minimum. System performance of a PMD compensator configured with a constant-length delay line having the optimum length approaches that of a PMD compensator configured with a variable-length delay line. The method extends the application range of constant-length delay line PMD compensators while reducing the cost of implementing high-performance PMD compensation.

20 Claims, 7 Drawing Sheets

OPTIMUM DELAY LENGTH FOR A PMD COMPENSATOR

BACKGROUND OF THE INVENTION

1. Field of the Invention

The present invention relates to optical communication equipment and, more specifically, to reducing effects of polarization mode dispersion (PMD).

2. Description of the Related Art

Polarization mode dispersion occurs in an optical fiber as a result of small birefringence induced by deviations of the fiber's core from a perfectly cylindrical shape, asymmetric stresses or strains, and/or random external forces acting upon the fiber. PMD is well known to severely impair transmission of optical signals at relatively high bit rates (e.g., 40 Gb/s) over relatively large distances (e.g., 1000 km).

One effect of PMD is that different polarization components of an optical signal at two principle states of polarization (PSP) travel in a fiber at different speeds such that a differential group delay (DGD) is introduced between those components. This effect is generally referred to as first-order PMD. Another effect of PMD is that the shapes of the optical pulses corresponding to different polarization components are distorted differently in the fiber. For example, an optical pulse corresponding to a first PSP may be broadened whereas an optical pulse corresponding to a second PSP may be narrowed. This effect is generally referred to as higher-order PMD. Within higher-order PMD, specific pulse shape distortions corresponding to the second-, third-, etc., orders of PMD may be discriminated. Both first-order PMD and higher-order PMD may significantly distort optical pulses corresponding to optical bits and consequently cause errors at the receiver.

Several techniques have been proposed to date to mitigate the effects of PMD in optical communication systems. Typically, a device known as a PMD compensator is deployed at the receiver end of a fiber transmission link to ensure that the receiver correctly decodes PMD-distorted optical bits.

FIG. 1 illustrates an exemplary prior art PMD compensator 100. Compensator 100 comprises a polarization controller (PC) 102, a DGD element 104, a state of polarization (SOP) monitor 106, and control electronics 108. Depending on the implementation, DGD element 104 may have a variable-length delay line or a constant-length delay line. During operation, PC 102 receives a PMD-distorted optical signal and separates it into two PSP components. DGD element 104 subjects the faster PSP component to a compensating delay to realign it with the slower PSP component. The two PSP components are then recombined and directed to, e.g., a receiver (not shown) for decoding. The output of DGD element 104 is tapped and analyzed by SOP monitor 106, which is configured to provide feedback to PC 102 and possibly to DGD element 104 via control electronics 108. For example, if DGD element 104 has a variable-length delay line, then two feedback signals 110 and 112 are generated by control electronics 108 and applied to DGD element 104 and PC 102, respectively. Based on those signals, PC 102 and DGD element 104 adaptively change their settings to correspond to the dynamically varying amount of PMD in the transmission link. On the other hand, if DGD element 104 has a constant-length delay line, then only signal 112 is generated by control electronics 108 and applied to PC 102. Certain implementations of PMD compensator 100 are described in commonly owned U.S. Pat. No. 5,930,414 by Fishman, et al., the teachings of which are incorporated herein by reference.

A PMD compensator configured with a variable-length delay line generally performs better than one configured with a constant-length delay line. However, it is typically more complex and expensive, and, in certain configurations, may also be less reliable due to the presence of mechanically moving parts in the variable-length delay line. Therefore, what is needed is a practical, cost-effective PMD compensator representing a tradeoff between the performance of variable-length delay line PMD compensators and the simplicity and reliability of constant-length delay line PMD compensators.

SUMMARY OF THE INVENTION

Embodiments of the present invention provide a method for selecting an optimum delay length in a polarization mode dispersion (PMD) compensator configured with a constant-length delay line and deployed in an optical communication system. The optimum delay length depends on the data modulation format, bit rate, and/or signal bandwidth and is preferably selected such that outage probability in the communication system is at a minimum. System performance of a PMD compensator configured with a constant-length delay line having the optimum length approaches that of a PMD compensator configured with a variable-length delay line. The method extends the application range of constant-length delay line PMD compensators while reducing the cost of implementing high-performance PMD compensation.

According to one embodiment, the present invention is a method of selecting an optimum length in a constant-length delay line of a polarization mode dispersion (PMD) compensator, the method comprising the steps of: (A) applying an optical signal to the PMD compensator; and (B) selecting the optimum length for the constant-length delay line based on bit error rate (BER) corresponding to the optical signal.

According to another embodiment, the present invention is a method for calibrating a polarization mode dispersion (PMD) compensator having a constant-length delay line, the method comprising the steps of: (A) applying a first calibration signal to the PMD compensator; and (B) finding an optimum length for the constant-length delay line based on bit error rate (BER) corresponding to the first calibration signal.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
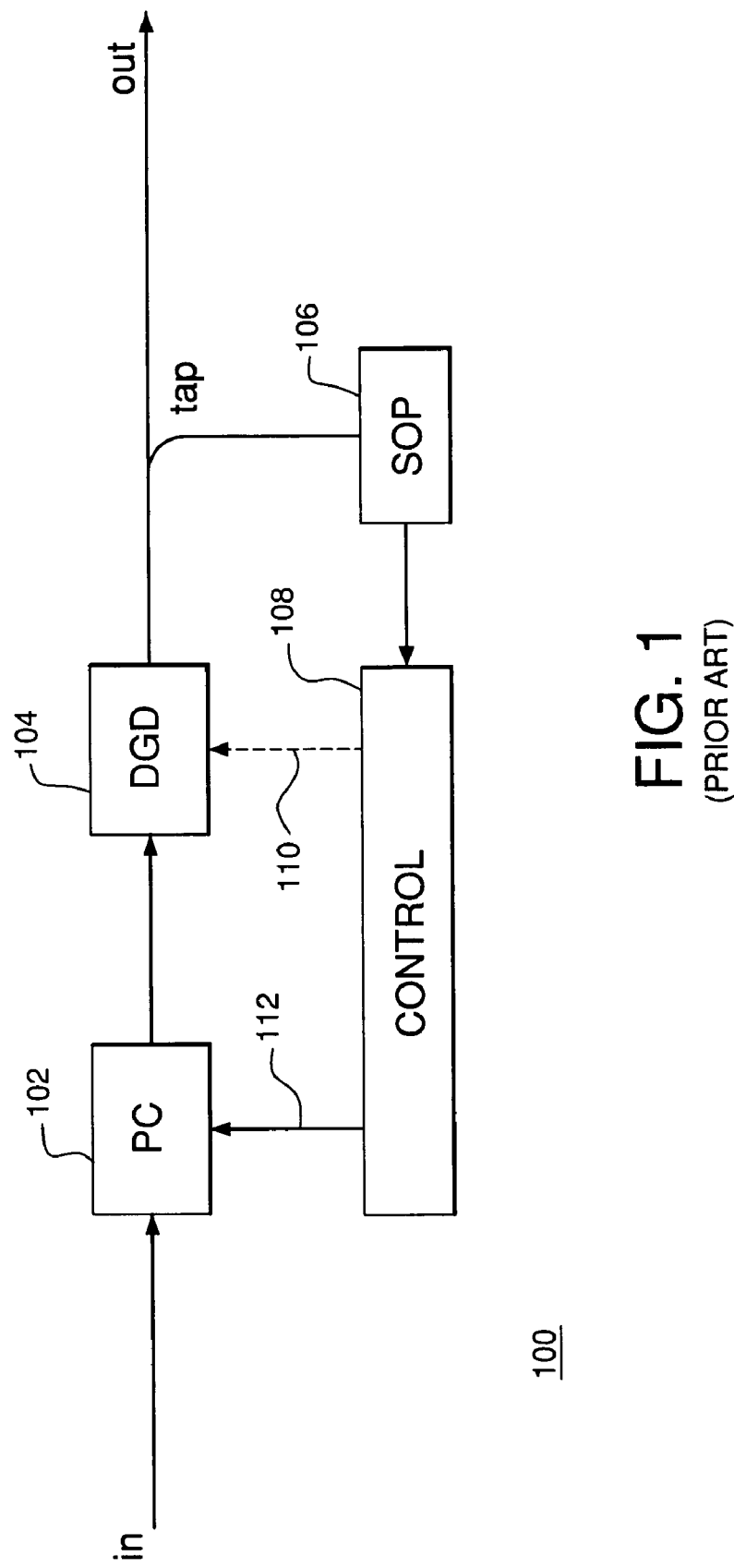
FIG. 1 illustrates an exemplary prior art PMD compensator.
Figure 2B:
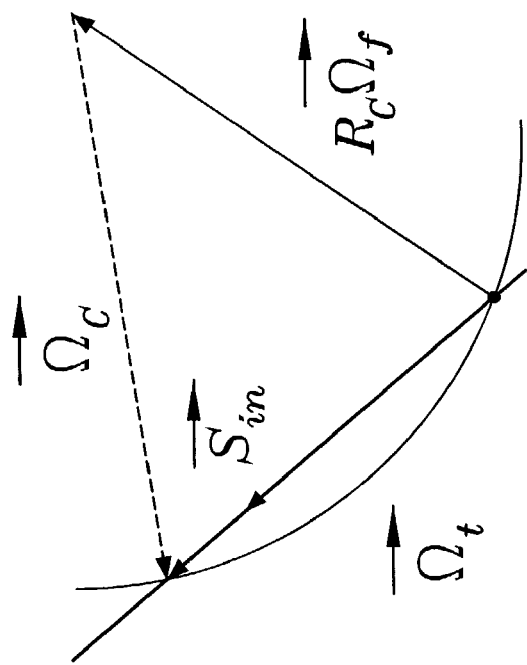
FIGS. 2A-B illustrate the principle of first-order PMD compensation using the PMD compensator of FIG. 1.
Figure 2A:
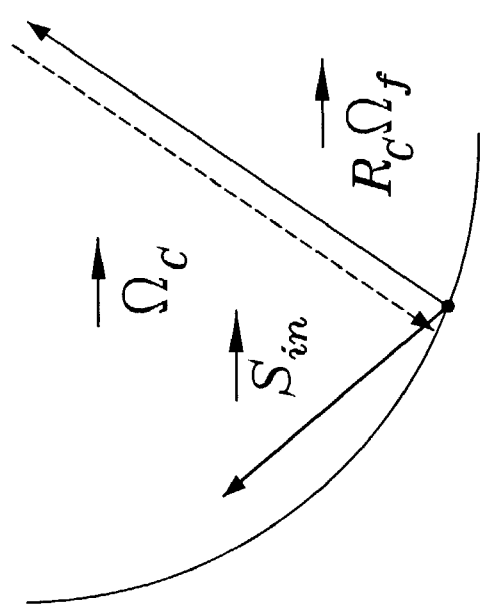

FIGS. 2A-B illustrate the principle of first-order PMD compensation, e.g., implemented by PMD compensator 100 shown in FIG. 1. Vectors designated as $\Omega_f$ and $\Omega_C$ represent in Stokes space the PMD vectors corresponding to the fiber transmission link and PMD compensator 100, respectively. In general, polarization controller (PC) 102 controls the orientation of vector $\Omega_C$, while differential group delay (DGD) element 104 controls the length of vector $\Omega_C$. As known in the art, a composite PMD vector ($\Omega_t$) representing a cumulative effect of the link and compensator 100 can be obtained by (i) applying a corresponding Müller rotation matrix, $R_C$, to vector $\Omega_f$ and (ii) performing a vector addition operation between the resulting vector $R_C\Omega_f$ and vector $\Omega_C$.

By controlling the operations of PC 102 and DGD 104, compensator 100 can be configured to operate at different operation points. Two of these operation points provide substantially complete compensation of first-order PMD. FIG. 2A shows a first operation point (point A), for which $\vec{\Omega}_C = -R_C\vec{\Omega}_f$ at the center frequency of the input signal. FIG. 2B shows a second operation point (point B), for which the composite PMD vector is collinear (i.e., parallel or anti-parallel) with the input signal polarization vector ($S_m$). Both of these operation points provide substantially complete compensation of first-order PMD.

When implemented with a variable-length delay line in DGD 104, compensator 100 can be operated at either operation point A or B, by controlling both the orientation and length of vector $\Omega_C$. When implemented with a constant-length delay line, however, compensator 100 cannot, in general, be operated at point A because the length of vector $\Omega_C$ is constant.

Although both operation points have a similar compensation effect on the first-order PMD, they produce different higher-order PMD results as illustratively demonstrated below for second-order PMD. In particular, second-order PMD is related to the derivative of the composite PMD vector and may be obtained from Equation (1) as follows:

$$\vec{\Omega}_t' = R_C\vec{\Omega}_f' + \vec{\Omega}_C' + \vec{\Omega}_C \times \vec{\Omega}_t = R_C\vec{\Omega}_f' + \vec{\Omega}_C \times \vec{\Omega}_t \quad (1)$$

where the prime represents a derivative with respect to angular frequency ($\omega$). In Equation (1), the term $R_C\vec{\Omega}_f'$ corresponds to second-order PMD induced in the fiber, while the term $\vec{\Omega}_C \times \vec{\Omega}_t$ corresponds to second-order PMD induced in compensator 100. Equation (1) shows that, at operation point A (FIG. 2A), the compensator does not induce second-order PMD in addition to that of the fiber transmission link because $\Omega_t$ is zero, whereas, at operation point B (FIG. 2B), the compensator does induce additional non-zero second-order PMD.

Referring again to FIG. 2B, since it is desirable to have good first-order PMD compensation for an arbitrary direction of $S_m$, compensator 100 operating at point B is typically configured to have a relatively large $|\Omega_C|$, and preferably $|\Omega_C| \geq |\Omega_f|$. However, as suggested by Equation (1) larger values of $|\Omega_C|$ will typically correspond to larger values of, e.g., second-order PMD, which tends to degrade the overall performance of the compensator. Therefore, there exists an optimum length of the delay line for a constant-length delay line PMD compensator that corresponds to an optimal overall compensation performance with respect to cumulative effects of first-order and higher-order PMD. Furthermore, since the effect of higher-order PMD on the performance is related to signal bandwidth, it is expected that the optimum length will be a function of signal bandwidth, which in turn is related to the modulation frequency and format. The following description illustrates the behavior of compensator 100 configured with a constant-length delay line and provides a method for selecting an optimum length for the same.

Figure 3B:
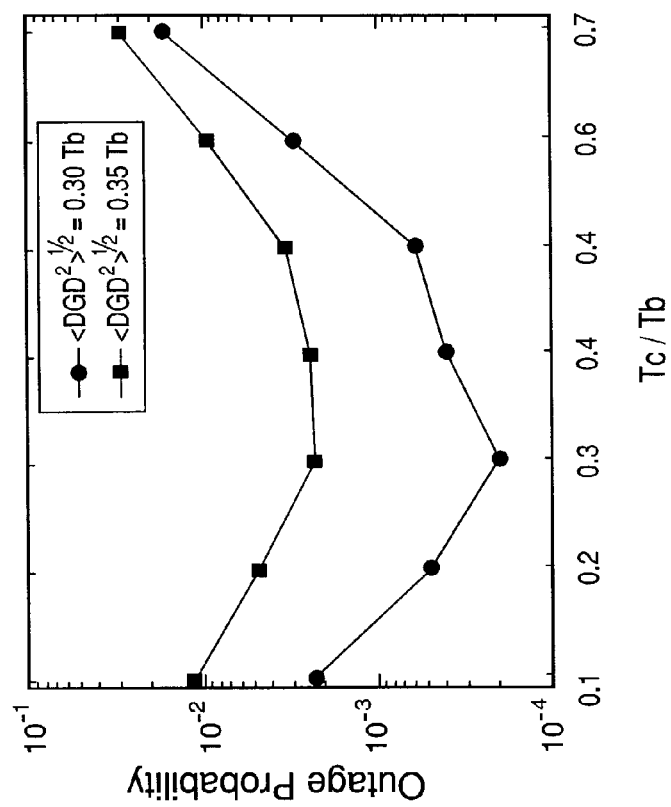
FIGS. 3A-B illustrate the performance of the PMD compensator of FIG. 1 configured with a constant-length delay line when the input signal is an on-off-keying (OOK) return-to-zero (RZ), 33% duty cycle, pseudo-random bit stream (PRBS)
Figure 3A:
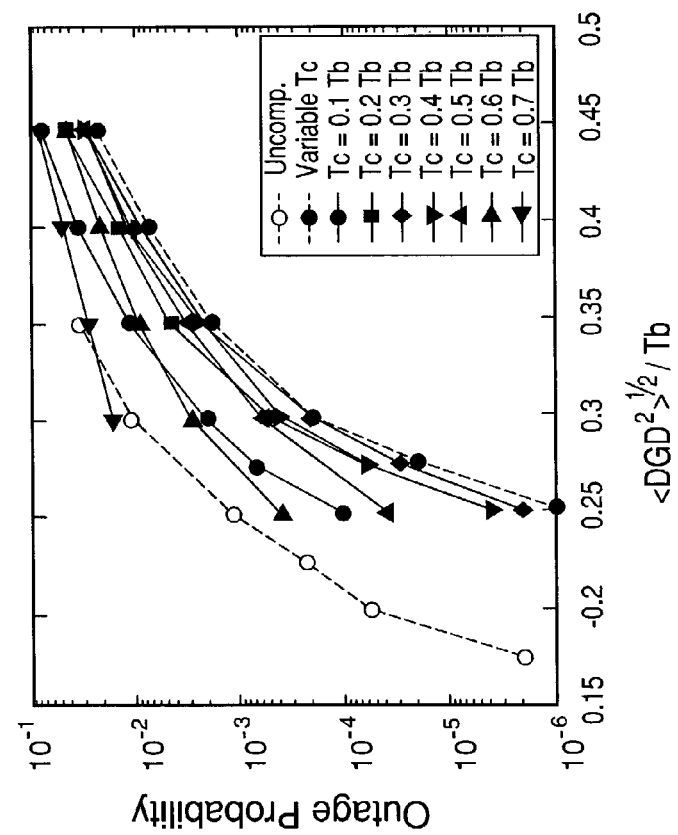

FIGS. 3A-B illustrate the performance of compensator 100 configured with a constant-length delay line when the input signal is an on-off-keying (OOK) return-to-zero (RZ), 33% duty cycle, pseudo-random bit stream (PRBS). More specifically, FIG. 3A shows outage probability (where outage is defined as an instance of bit error rate (BER) exceeding $10^{-12}$) as a function of the amount of differential group delay (DGD) in they fiber transmission link, where the DGD amount is measured with respect to the bit period ($T_b$). Different symbols and/or line styles in FIG. 3A correspond to different configurations of compensator 100. In particular, (i) the dotted line with solid circles in FIG. 3A corresponds to compensator 100 configured with a variable-length delay line; (ii) the different solid lines with solid symbols correspond to compensator 100 configured with different constant-length delay lines, where the corresponding delay line length ($T_c$) is given with respect to the bit period in the legend box; and (iii) the dotted line with open circles correspond to an uncompensated system (i.e., one that does not have a PMD compensator). As can be seen in FIG. 3A, the performance of PMD compensator 100 configured with a constant-length delay line set at $T_c/T_b \approx 0.3$ approaches that of PMD compensator 100 configured with a variable-length delay line. Both configurations provide significant improvement over the uncompensated system.

FIG. 3B shows a subset of data of FIG. 3A for two representative DGD values (i.e., 0.30 $T_b$ and 0.35 $T_b$ as indicated in the legend box in FIG. 3B) as a function of length $T_c$ of the constant-length delay line in PMD compensator 100. As can be seen in FIG. 3B, when the delay-line length is small, e.g., $T_c/T_b \approx 0.1$, the outage probability is relatively high due to under-compensation of first-order PMD. On the other hand, when the delay-line length is large, e.g., $T_c/T_b \approx 0.7$, the outage probability is again relatively high due to the effects of higher-order PMD. However, when $T_c/T_b$ is about 0.3, the outage probability is at a minimum, which optimizes performance of the compensator. Therefore, as demonstrated by FIGS. 3A-B, for an OOK RZ, 33% duty cycle, PRBS, PMD compensator 100 configured with a constant-length delay line having the length corresponding to about 30% of the bit period may provide the performance similar to that of a variable delay-length PMD compensator, but at a fraction of the cost.

Figure 4A:
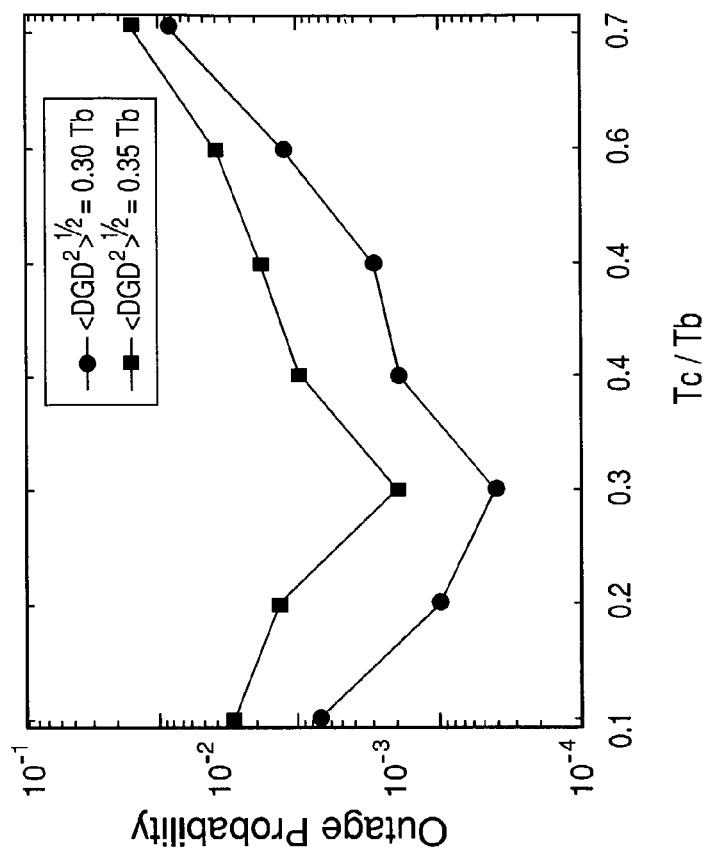
FIGS. 4A-B illustrate the performance of the PMD compensator of FIG. 1 configured with a constant-length delay line when the input signal is a differential-phase-shift-keying (DPSK) RZ, 33% duty cycle, PRBS.
Figure 4B:
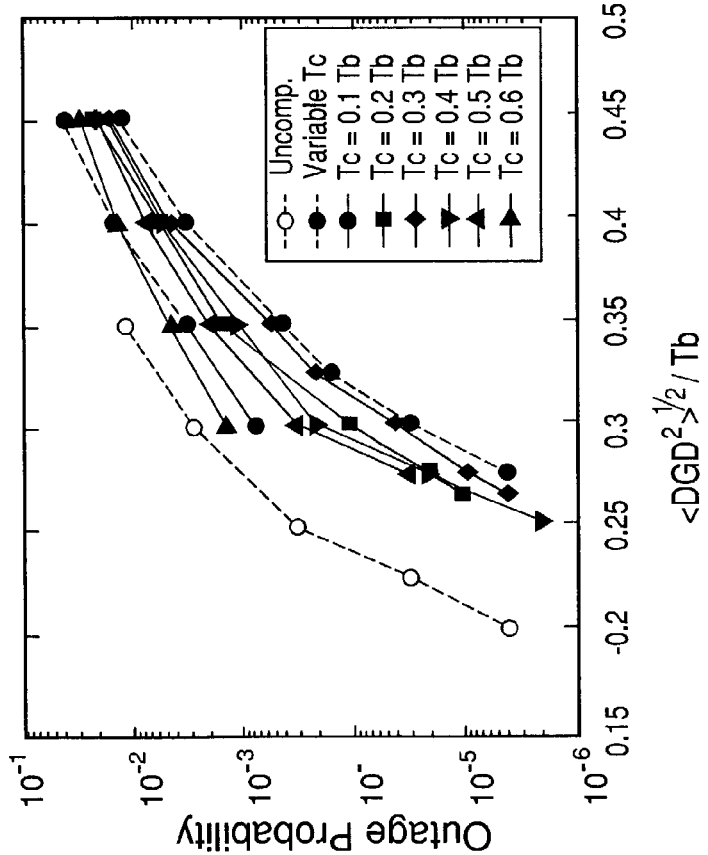

FIGS. 4A-B are similar to FIGS. 3A-B and illustrate the performance of compensator 100 configured with a constant-length delay line when the input signal is a differential-phase-shift-keying (DPSK) RZ, 33% duty cycle, PRBS. Similar to the case illustrated in FIGS. 3A-B, the performance of PMD compensator 100 configured with a constant-length delay line similarly set at $T_c/T_b \approx 0.3$ approximates that of PMD compensator 100 configured with a variable-length delay line. The similar optimum values of the delay-line length for OOK and DPSK signals are primarily due to the similar signal bandwidths corresponding to those two data modulation formats.

Figure 5B:
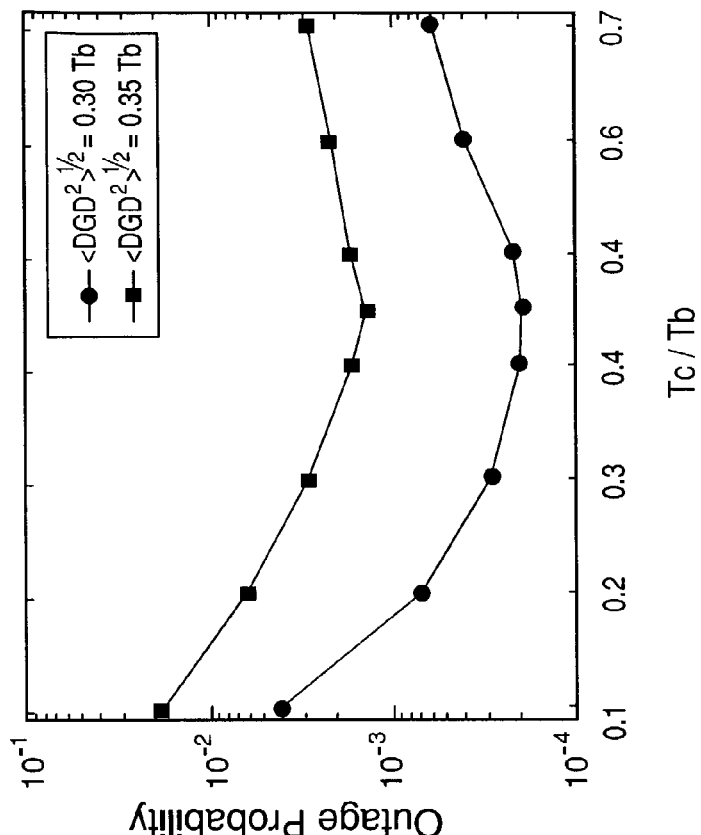
FIGS. 5A-B illustrate the performance of the PMD compensator of FIG. 1 configured with a constant-length delay line when the input signal is a carrier-suppressed (CS) RZ, 67% duty cycle, PRBS.
Figure 5A:
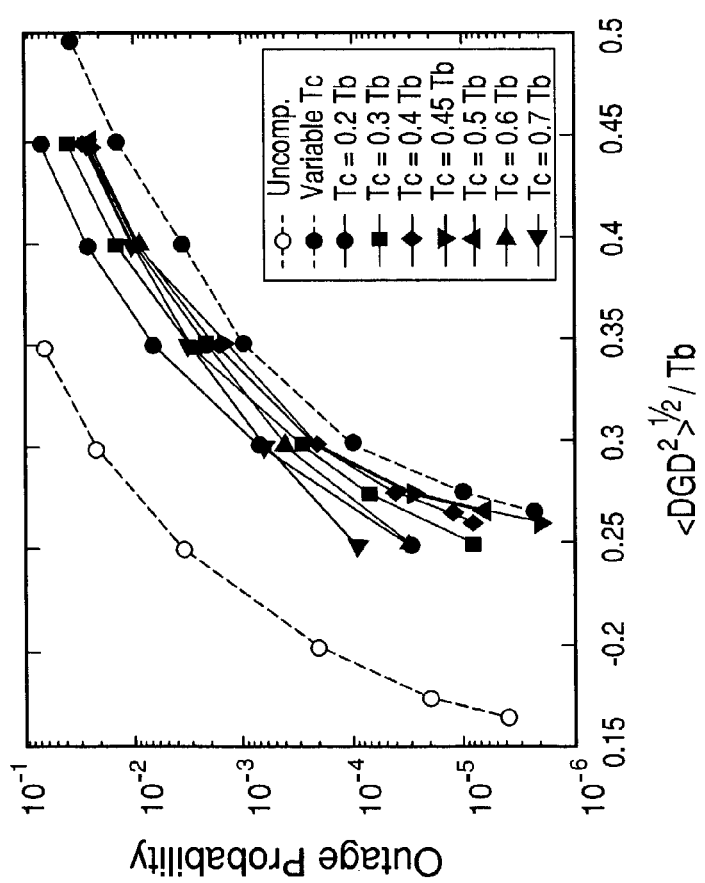

FIGS. 5A-B are also similar to FIGS. 3A-B and illustrate the performance of compensator 100 configured with a constant-length delay line when the input signal is a carrier-suppressed (CS) RZ, 67% duty cycle, PRBS. As can be seen in FIGS. 5A-B, the performance of PMD compensator 100 configured with a constant-length delay line set at $T_c/T_b \approx 0.45$ also approximates that of PMD compensator 100 configured with a variable-length delay line. Since the bandwidth corresponding to the CS RZ signal is different from those for OOK and DPSK signals, a different optimum delay line length is obtained for this data modulation format.

The following table compares PMD tolerances (defined as a tolerable average DGD over a bit period corresponding to an outage probability of $10^{-5}$ or less and a power margin of 1 dB) for different data modulation formats/compensation schemes.

| Data Format | Without PMD Compensation | Optimum Constant-Length Delay Line PMD Compensation | Variable-Length Delay Line PMD Compensation |
|---|---|---|---|
| OOK RZ (33%) | 18.6% | 26.5% | 26.9% |
| DPSK RZ (33%) | 21.1% | 27.7% | 28.7% |
| CS RZ (67%) | 17.1% | 26.9% | 27.5% |

For example, an optical transmission system having PMD compensator 100 configured with an optimum constant-length delay line for transmission of OOK RZ, 33% duty cycle, 40-Gb/s PRBS signals can tolerate up to 6.6 ps of DGD (=25 ps ($T_b$ for 40 Gb/s)×26.5% (the corresponding table entry)). As can be seen from the table, similar tolerance levels may be achieved for different data modulation formats with either optimum constant-length or variable-length delay line PMD compensation schemes, which levels are considerably higher than those for the uncompensated system.

Figure 6:
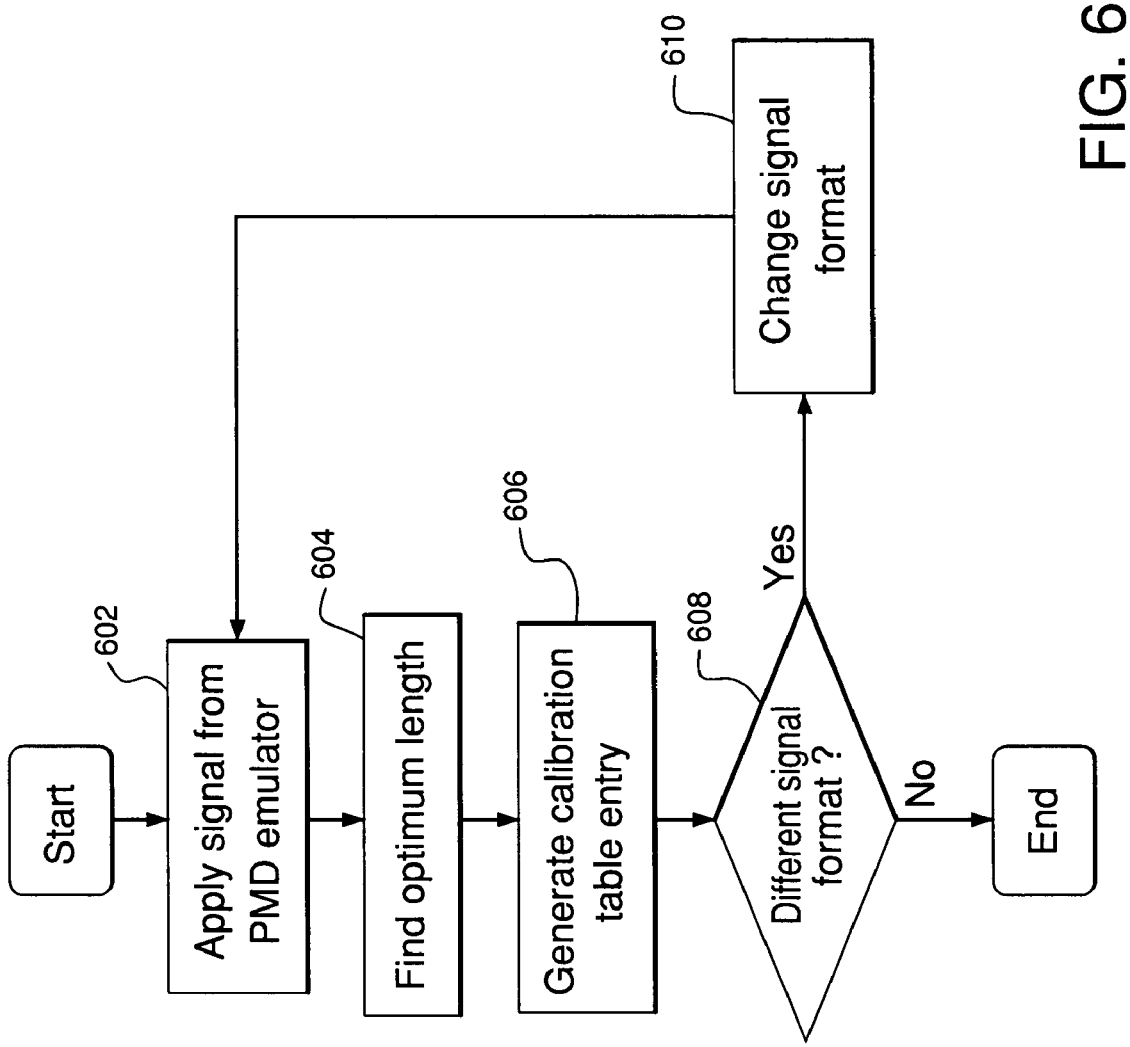
FIG. 6 shows a method of generating a calibration table, which may be used for selecting an optimum delay-line length in the compensator of FIG. 1 according to one embodiment of the present invention.

FIG. 6 shows a method 600 of generating a calibration table, which may be used for selecting an optimum delay-line length in compensator 100 configured with a constant-length delay line according to one embodiment of the present invention. In step 602 of method 600, a calibration signal is applied to and distorted by a PMD emulator and then applied to compensator 100. As known in the art, a PMD emulator is a device that can mimic the effects of PMD. However, the PMD generated in a PMD emulator is such that the principal polarization states and/or DGD are under control of an operator rather than being stochastic as in a real transmission system. As a result, performance of compensator 100 can be thoroughly evaluated, for example, at a chosen value of DGD. In step 604 of method 600, an optimum length for the constant-length delay line is found, for example, by manually adjusting the length of the delay line to minimize the BER in the compensated signal, e.g., as illustrated above in FIG. 3B, 4B, or 5B. The found optimum length is entered into a calibration table in step 606. If performance of compensator 100 needs to be evaluated for a different data modulation format (step 608), a different calibration signal corresponding to that data format is chosen in step 610. Steps 602-606 are then repeated using the different calibration signal to generate a new calibration table entry. In one embodiment, the calibration table includes an optimum length or a range of optimum lengths for each different data modulation format. The different formats specified in the calibration table may, for example, differ by one or more of the following characteristics: (1) amplitude or phase modulation; (2) RZ or non-RZ (NRZ); (3) duty cycle; (4) signal bandwidth; and (5) bit rate. In another embodiment, the calibration table includes an optimum length or a range of optimum lengths for each of different data signal bandwidths corresponding to one or more center frequencies.

Figure 7:
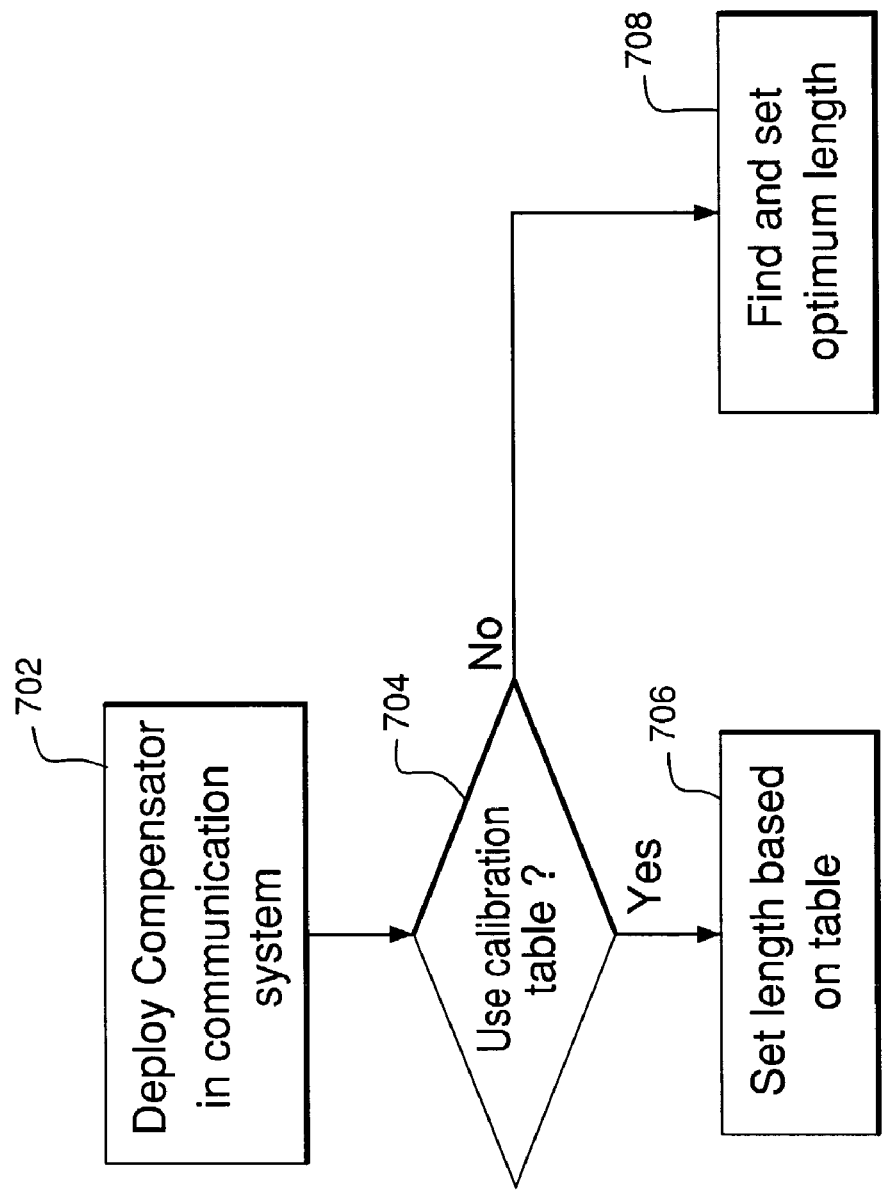
FIG. 7 shows a method of selecting an optimum delay-line length in the compensator of FIG. 1 according to one embodiment of the present invention.

FIG. 7 shows a method 700 of selecting an optimum delay-line length in compensator 100 configured with a constant-length delay line according to one embodiment of the present invention. In step 702, compensator 100 is deployed in an optical communication system, e.g., at the receiver end of a long-haul transmission link. If it is decided in step 704 that the delay-line length will be set based on the calibration table (e.g., generated according to method 600 of FIG. 6), an entry in the calibration table corresponding to the type of data signal used in the communication system is found and a corresponding optimum delay-line length is set in step 706. If it is decided in step 704 that the calibration table will not (or cannot) be used, an optimum delay-line length is found on line and set in step 708. In one embodiment, step 708 is performed, e.g., by transmitting a known data sequence over the transmission link and determining BERs corresponding to different delay-line lengths. The optimum delay-line length is then selected, e.g., as the delay-line length corresponding to a minimum BER.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims. For example, the present invention may be practiced in optical communication systems operating at different bit rates and transmitting optical signals using light of different wavelengths. In addition to the exemplary data modulation formats illustratively considered in the specification, the present invention may also be practiced for other data modulation formats. Furthermore, a PMD compensator may be designed to enable a change of the delay length if, for example, the data modulation format and/or bit rate in the communication system is changed.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method of selecting an optimum length in a constant-length delay line of a polarization mode dispersion (PMD) compensator, the method comprising the steps of:
   (A) applying an optical signal to the PMD compensator; and
   (B) selecting the optimum length for the constant-length delay line based on bit error rate (BER) corresponding to the optical signal, wherein:
      the optical signal is an output signal of a link in an optical transmission system; and
      the selecting step comprises the steps of:
         selecting the optimum length based on a data modulation format corresponding to the output signal;
         determining outage probability corresponding to different lengths of the constant-length delay line based on BER; and
         selecting a length of the constant-length delay line corresponding to a minimum of the outage probability determined in the step of determining.

2. The method of claim 1, wherein step (B) comprises the step of selecting the optimum length for the constant-length delay line such that the BER is substantially minimized.

3. The method of claim 1, wherein step (B) comprises the step of selecting the optimum length for the constant-length delay line using a calibration table that tabulates optimum lengths for different types of optical signals.

4. The method of claim 1, wherein the optical signal is generated by applying a calibration signal to a PMD emulator.

5. The method of claim 4, wherein step (B) comprises the step of generating a calibration table entry corresponding to the calibration signal.

6. The method of claim 5, further comprising the step of repeating steps (A) and (B) using a different calibration signal to generate another calibration table entry.

7. The method of claim 1, further comprising the step of changing the optimum length, if the data modulation format is changed.

8. The method of claim 1, wherein step (B) comprises the step of selecting the optimum length based on a bandwidth corresponding to the output signal.

9. The method of claim 1, wherein the constant-length delay line has a differential propagation delay substantially independent of wavelength.

10. The method of claim 1, wherein the optimum length corresponds to an optimal compensation performance with respect to first-order PMD and higher-order PMD.

11. The method of claim 1, wherein the constant-length delay line is adapted to subject a faster principal state-of polarization (PSP) component of the optical signal to a compensating delay with respect to a slower PSP component of said signal.

12. A method for calibrating a polarization mode dispersion (PMD) compensator having a constant-length delay line, the method comprising the steps of:
   (A) applying a first calibration signal to the PMD compensator; and
   (B) finding an optimum length for the constant-length delay line based on bit error rate (BER) corresponding to the first calibration signal, wherein the finding step comprises the steps of:
      (B1) determining outage probability corresponding to different lengths of the constant-length delay line based on BER; and
      (B2) selecting a length of the constant-length delay line corresponding to a minimum of the outage probability determined in step (B1).

13. The method of claim 12, wherein step (B) comprises the step of generating a calibration table entry corresponding to the first calibration signal.

14. The method of claim 13, further comprising the step of repeating steps (A) and (B) using a second calibration signal.

15. The method of claim 14, wherein the first and second calibration signals have different data modulation formats.

16. The method of claim 14, wherein substantially similar optimum lengths are selected for optical signals having different data modulation formats whose corresponding bandwidths are substantially equivalent.

17. The method of claim 14, wherein the first and second calibration signals have different bandwidths.

18. The method of claim 12, wherein the constant-length delay line has a differential propagation delay substantially independent of wavelength.

19. The method of claim 12, wherein the optimum length corresponds to an optimal compensation performance with respect to first-order PMD and higher-order PMD.

20. The method of claim 12, wherein the constant-length delay line is adapted to subject a faster principal state-of-polarization (PSP) component of the first calibration signal to a compensating delay with respect to a slower PSP component of said signal.

* * * * *